United States Patent
Mohan Raj et al.

(10) Patent No.: US 12,531,894 B2
(45) Date of Patent: Jan. 20, 2026

(54) METHODS, SYSTEMS, AND COMPUTER READABLE MEDIA FOR DETECTING AND MITIGATING SECURITY ATTACKS ON PRODUCER NETWORK FUNCTIONS (NFs) USING ACCESS TOKEN TO NON-ACCESS-TOKEN PARAMETER CORRELATION AT PROXY NF

(71) Applicant: Oracle International Corporation, Redwood Shores, CA (US)

(72) Inventors: John Nirmal Mohan Raj, Bangalore (IN); Ashish Jyoti Sharma, New Delhi (IN); Jay Rajput, Bangalore (IN); Sonia Kadyan, New Delhi (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 183 days.

(21) Appl. No.: 18/523,425

(22) Filed: Nov. 29, 2023

(65) Prior Publication Data

US 2025/0175491 A1  May 29, 2025

(51) Int. Cl.
*H04L 9/40* (2022.01)
(52) U.S. Cl.
CPC .............................. *H04L 63/1441* (2013.01)
(58) Field of Classification Search
None
See application file for complete search history.

(56) References Cited

U.S. PATENT DOCUMENTS 10,778,527 B2  9/2020  Assali et al.
11,483,741 B2  10/2022  Nair et al.
(Continued)

FOREIGN PATENT DOCUMENTS

| CN | 112003912 B | 11/2021 | |
|---|---|---|---|
| EP | 4 152 691 A1 | 3/2023 | |
| WO | WO-2024125763 A1 * | 6/2024 | .......... H04W 12/084 |

OTHER PUBLICATIONS

Commonly-Assigned, co-pending U.S. Appl. No. 18/414,455 for "Methods, Systems, and Computer Readable Media for Detecting and Processing Inter-Public Land Mobile Network (PLMN) Service-Based Interface (SBI) Messages Without 3GPP-SBI-ORIGINATING-NETWORK-ID Headers" (Unpublished, filed Jan. 16, 2024).

(Continued)

*Primary Examiner* — Michael Pyzocha
(74) *Attorney, Agent, or Firm* — Jenkins, Taylor & Hunt, P.A.

(57) ABSTRACT

A method for detecting and mitigating security attacks on producer network NFs using access token to non-access-token parameter correlation at a proxy NF includes receiving an inter-PLMN SBI request message. The method further includes obtaining, from an access token transmitted with the inter-PLMN SBI request message, at least one network- or service-identifying parameter and obtaining, externally from the access token, at least one network- or service-identifying parameter. The method further includes comparing the at least one network- or service-identifying parameter obtained from the access token and the at least one network- or service-identifying parameter obtained externally from the access token and performing a network security action when the at least one network- or service-identifying parameter obtained from the access token does not match the at least one network- or service-identifying parameter obtained externally from the access token.

18 Claims, 7 Drawing Sheets

(56) References Cited

U.S. PATENT DOCUMENTS

| | | | |
|---|---|---|---|
| 11,533,358 | B1 | 12/2022 | Khare et al. |
| 11,553,342 | B2 | 1/2023 | Mahalank et al. |
| 11,825,310 | B2 | 11/2023 | Rajput et al. |
| 12,425,863 | B2 | 9/2025 | Kadyan et al. |
| 2020/0036754 | A1 | 1/2020 | Livanos |
| 2021/0111985 | A1 | 4/2021 | Mahalank |
| 2021/0297935 | A1* | 9/2021 | Belling .................. H04W 40/00 |
| 2022/0022040 | A1* | 1/2022 | Mahalank ............. H04W 12/08 |
| 2022/0053372 | A1* | 2/2022 | Shekhar .................. H04L 67/56 |
| 2022/0070648 | A1 | 3/2022 | Krishan |
| 2022/0095111 | A1* | 3/2022 | Fu ..................... H04W 36/0011 |
| 2022/0104020 | A1 | 3/2022 | Rajput |
| 2022/0159464 | A1* | 5/2022 | Rajput .................. H04W 48/08 |
| 2022/0200847 | A1 | 6/2022 | Bartolome Rodrigo |
| 2022/0201487 | A1* | 6/2022 | Minokuchi ........... H04L 63/166 |
| 2022/0247779 | A1* | 8/2022 | Rajput .................... H04L 63/20 |
| 2022/0272165 | A1* | 8/2022 | Bawa .................. H04L 61/4541 |
| 2022/0287089 | A1 | 9/2022 | Singh |
| 2022/0294775 | A1* | 9/2022 | Singh .................. H04L 63/0884 |
| 2022/0295282 | A1* | 9/2022 | Rajput .................... H04W 8/18 |
| 2022/0353263 | A1 | 11/2022 | Choyi et al. |
| 2022/0360447 | A1* | 11/2022 | Rajput .................. H04L 9/3247 |
| 2022/0360989 | A1* | 11/2022 | Rajput .................. H04W 12/06 |
| 2022/0361085 | A1* | 11/2022 | Rajput .................. H04W 60/00 |
| 2023/0052658 | A1* | 2/2023 | Khare .................... H04L 63/205 |
| 2023/0141233 | A1* | 5/2023 | Pulipati ................. H04W 48/16 726/4 |
| 2023/0199497 | A1 | 6/2023 | Krishan et al. |
| 2023/0284008 | A1 | 9/2023 | Muhanna et al. |
| 2023/0396602 | A1* | 12/2023 | Wu ..................... H04W 12/009 |
| 2023/0413052 | A1* | 12/2023 | Aggarwal ........... H04W 12/082 |
| 2024/0056506 | A1* | 2/2024 | Bommisetty ......... G06F 21/645 |
| 2024/0129876 | A1 | 4/2024 | Sarma |
| 2024/0381224 | A1* | 11/2024 | Landais ................ H04W 48/02 |
| 2025/0126475 | A1* | 4/2025 | Li ........................... H04L 67/51 |
| 2025/0175800 | A1 | 5/2025 | Kadyan et al. |
| 2025/0175801 | A1 | 5/2025 | Kadyan et al. |
| 2025/0234187 | A1 | 7/2025 | Mohan Raj et al. |
| 2025/0294358 | A1 | 9/2025 | Mohan Raj et al. |

OTHER PUBLICATIONS

Commonly-Assigned, co-pending U.S. Appl. No. 18/523,487 for "Methods, Systems, and Computer Readable Media for Detecting and Mitigating Security Attacks on Producer Network Functions (NFs) Using Mappings Between Dynamically Assigned Service-Based Interface (SBI) Message Identifiers and Proxy NF Identifiers at Proxy Nf" (Unpublished, filed Nov. 29, 2023).

Commonly-Assigned, co-pending U.S. Appl. No. 18/523,322 for "Methods, Systems, and Computer Readable Media for Detecting and Mitigating Security Attacks on Producer Network Functions (NFs) Using Error Response Messages" (Unpublished, filed Nov. 29, 2023).

3rd Generation Partnership Project; Technical Specification Group Core Network and Terminals; 5G System; Public Land Mobile Network (PLMN) Interconnection; Stage 3 (Release 18) 3GPP TS 29.573 V18.4.0 pp. 1-116 (Sep. 2023).

3rd Generation Partnership Project; Technical Specification Group Core Network and Terminals; 5G System; Technical Realization of Service Based Architecture; Stage 3 (Release 18) 3GPP TS 29.500 V18.4.0 pp. 1-149 (Dec. 2023).

3rd Generation Partnership Project; Technical Specification Group Core Network and Terminals; 5G System; Network Function Repository Services; Stage 3 (Release 18) 3GPP TS 29.510 V18.5.0, pp. 1-382 (Dec. 2023).

3rd Generation Partnership Project; Technical Specification Group Core Network and Terminals; 5G System; Public Land Mobile Network (PLMN) Interconnection; Stage 3 (Release 18) 3GPP TS 29.573 V18.5.0 pp. 1-130 (Dec. 2023).

3rd Generation Partnership Project; Technical Specification Group Services and System Aspects; Security architecture and procedures for the 5G System; Stage 2 (Release 18) 3GPP TS 33.501 V18.4.0 pp. 1-326 (Dec. 2023).

Keller et al., "Roaming in the 5G System: the 5GS roaming architecture," Ericsson Technology Review Articles (Jun. 17, 2021).

5G Roaming Guidelines, Official Document NG.113—GSM Association Version 2.0, pp. 1-36 (May 28, 2020).

Content for TS 33.501 Word version: 18.4.0, pp. 1-8 (Downloaded Jan. 31, 2024) https://www.tech-invite.com/3m33/toc/tinv-3gpp-33-501_e.html.

Commonly-Assigned, co-pending U.S. Appl. No. 18/608,071 for "Methods, Systems, and Computer Readable Media for Filtering Inter-Public Land Mobile Network (PLMN) Messages at Security Edge Protection Proxy (SEPP) to Implement Roaming Agreements" (Unpublished, filed Mar. 18, 2024).

3rd Generation Partnership Project; Technical Specification Group Services and System Aspects; Security architecture and pocedures, 3GPP Draft; 33501-HA0, 3rd Generation Partnership Project (3GPP), Jun. 22, 2023.

Notification of Transmittal of the International Search Report and the Written Opinion of the International Searching Authority, or the Declaration for International Patent Application Serial No. PCT/US2024/053761 (Feb. 4, 2025).

"3rd Generation Partnership Project; Technical Specification Group Services and System Aspects; System architecture for the 5G System (5GS); Stage 2 (Release 18)" 3GPP TS 23.501, V18.3.0, pp. 1-696 (Sep. 2023).

"3rd Generation Partnership Project; Technical Specification Group Services and System Aspects; Procedures for the 5G System (5GS); Stage 2 (Release 18)" 3GPP TS 23.502, V18.3.0, pp. 1-899 (Sep. 2023).

"3rd Generation Partnership Project; Technical Specification Group Core Network and Terminals; 5G System; Technical Realization of Service Based Architecture; Stage 3 (Release 18)" 3GPP TS 29.500, V18.3.0, pp. 1-148 (Sep. 2023).

"3rd Generation Partnership Project; Technical Specification Group Core Network and Terminals; 5G System; Session Management Services; Stage 3 (Release 18)" 3GPP TS 29.502, V18.4.0, pp. 1-355 (Sep. 2023).

"3rd Generation Partnership Project; Technical Specification Group Core Network and Terminals; 5G System; Network Function Repository Services; Stage 3 (Release 18)" 3GPP TS 29.510, V18.4.0, pp. 1-373 (Sep. 2023).

"3rd Generation Partnership Project; Technical Specification Group Services and System Aspects; Security architecture and procedures for 5G System (Release 18)" 3GPP TS 33.501, V18.3.0, pp. 1-322 (Sep. 2023).

Notice of Allowance for U.S. Appl. No. 18/523,322 (Jul. 18, 2025).

Tang, "A Systematic Analysis of 5G Networks with a Focus on 5G Core Security", Feb. 10, 2022, IEEE, pp. 18298-18318 (Year 2022).

Non-Final Office Action for U.S. Appl. No. 18/523,487 (Oct. 23, 2025).

* cited by examiner

METHODS, SYSTEMS, AND COMPUTER READABLE MEDIA FOR DETECTING AND MITIGATING SECURITY ATTACKS ON PRODUCER NETWORK FUNCTIONS (NFs) USING ACCESS TOKEN TO NON-ACCESS-TOKEN PARAMETER CORRELATION AT PROXY NF

TECHNICAL FIELD

The subject matter described herein relates to mitigating security attacks in communications networks. More particularly, the subject matter described herein relates to methods, systems, and computer readable media for detecting and mitigating security attacks on producer NFs using access token to SBI message validation at a proxy NF, such as a security edge protection proxy (SEPP) or a service communication proxy (SCP).

BACKGROUND

In 5G telecommunications networks, a network function that provides service is referred to as a producer NF or NF service producer. A network function that consumes services is referred to as a consumer NF or NF service consumer. A network function can be a producer NF, a consumer NF, or both, depending on whether the network function is consuming, producing, or consuming and producing services. The terms "producer NF" and "NF service producer" are used interchangeably herein. Similarly, the terms "consumer NF" and "NF service consumer" are used interchangeably herein.

A given producer NF may have many service endpoints, where a service endpoint is the point of contact for one or more NF instances hosted by the producer NF. The service endpoint is identified by a combination of Internet protocol (IP) address and port number or a fully qualified domain name (FQDN) that resolves to an IP address and port number on a network node that hosts a producer NF. An NF instance is an instance of a producer NF that provides a service. A given producer NF may include more than one NF instance. It should also be noted that multiple NF instances can share the same service endpoint.

NFs register with a network function repository function (NRF). The NRF maintains profiles of available NF instances identifying the services supported by each NF instance. The profile of an NF instance is referred to in 3GPP TS 29.510 as an NF profile. NF instances can obtain information about other NF instances that have registered with the NRF through the NF discovery service operation. According to the NF discovery service operation, a consumer NF sends an NF discovery request to the NRF. The NF discovery request includes query parameters that the NRF uses to locate the NF profiles of producer NFs capable of providing the service identified by the query parameters. NF profiles are data structures that define the type of service provided by an NF instance as well as contact and capacity information regarding the NF instance.

An SCP can also invoke the NF discovery service operation to learn about available producer NF instances. The case where the SCP uses the NF discovery service operation to obtain information about producer NF instances on behalf of consumer NFs is referred to as delegated discovery. Consumer NFs connect to the SCP, and the SCP load balances traffic among producer NF service instances that provide the required services or directly routes the traffic to the destination producer NF instances.

One problem that can occur in 5G and other types of networks is that inter-public land mobile network (PLMN) SBI request messages from trusted networks can be used by a hacker to overwhelm the processing and/or memory resources of a producer NF and cause the producer NF to become unavailable. For example, a consumer NF in a trusted network can be compromised by malware code and forced to send a high volume of SBI request messages to another network. Because the inter-PLMN SBI request messages originate from a trusted network, the receiving network allows the SBI request messages to be forwarded to the producer NF. The producer NF processes the messages, which makes the producer NF unavailable to process messages from legitimate consumer NFs. The attempt to overwhelm the resources of a computing entity is referred to as a denial of service (DOS) attack.

The use of access tokens provides some security for accessing services in a PLMN. However, valid access tokens obtained by a consumer NF that has been compromised can be used to send SBI request messages to overwhelm the resources of a producer NF.

Accordingly, in light of these and other difficulties, there exists a need for improved methods, systems, and computer readable media for screening inter-PLMN SBI request messages at a proxy NF to mitigate DoS and other types of security attacks.

SUMMARY

A method for detecting and mitigating security attacks on producer network functions (NFs) using access token to non-access-token parameter correlation at a proxy NF includes receiving, by the proxy NF, an inter-public land mobile network (PLMN) service-based interface (SBI) request message. The method further includes obtaining, by the proxy NF and from an access token transmitted with the inter-PLMN SBI request message, at least one network-identifying or service-identifying parameter. The method further includes obtaining, by the proxy NF and externally from the access token, at least one network-identifying or service-identifying parameter. The method further includes comparing, by the proxy NF, the at least one network-identifying or service-identifying parameter obtained from the access token and the at least one network-identifying or service-identifying parameter obtained externally from the access token. The method further includes performing, by the proxy NF, a network security action when the at least one network-identifying or service-identifying parameter obtained from the access token does not match the at least one network-identifying or service-identifying parameter obtained externally from the access token.

According to another aspect of the subject matter described herein, obtaining the at least one network-identifying or service-identifying parameter from the access token comprises obtaining a producer service name parameter from a scope field of the access token, obtaining the at least one network-identifying or service-identifying parameter externally from the access token includes obtaining a service name from a 3gpp-Sbi-Target-apiRoot header of the inter-PLMN SBI request message, comparing the at least one network-identifying or service-identifying parameter obtained from the access token and the at least one network-identifying parameter or service-identifying parameter obtained externally from the access token includes comparing the producer service name obtained from the scope field of the access token with the service name obtained from the 3gpp-Sbi-Target-apiRoot header of the inter-PLMN SBI request message; and performing the network security action includes performing the network security action when the service name obtained from the scope field of the access token and the service name obtained from the 3gpp-Sbi-Target-apiRoot header of the inter-PLMN SBI request message do not match.

According to another aspect of the subject matter described herein, obtaining at least one network-identifying or service-identifying parameter from the access token comprises obtaining a target PLMN ID from the access token, obtaining the at least one network-identifying or service-identifying parameter externally from the access token includes obtaining a PLMN ID from a fully qualified domain name (FQDN) from a 3gpp-Sbi-Target-apiRoot header of the inter-PLMN SBI request message, comparing the at least one network-identifying or service-identifying parameter from the access token and the at least one network-identifying or service-identifying parameter obtained externally from the access token includes comparing the target PLMN ID obtained from the access token with the PLMN ID obtained from the FQDN of the 3gpp-Sbi-Target-apiRoot header of the inter-PLMN SBI request message, and performing the network security action includes performing the network security action when the target PLMN ID obtained from the access token and the PLMN ID obtained from the FQDN of the 3gpp-Sbi-Target-apiRoot header of the inter-PLMN SBI request do not match.

According to another aspect of the subject matter described herein, obtaining the at least one network-identifying or service-identifying parameter from the access token comprises obtaining a PLMN ID from the access token, obtaining the at least one network-identifying or service-identifying parameter externally from the access token includes obtaining a SEPP PLMN ID, comparing the at least one network-identifying or service-identifying parameter obtained from the access token and the at least one network-identifying or service-identifying parameter obtained externally from the access token includes comparing the PLMN ID obtained the access token with the SEPP PLMN ID, performing the network security action includes performing the network security action when the PLMN ID obtained from the access token and the SEPP PLMN ID do not match.

According to another aspect of the subject matter described herein, obtaining at least one network-identifying or service-identifying parameter from the access token comprises obtaining a PLMN ID from the access token, obtaining the at least one parameter external to the access token includes obtaining a remote SEPP PLMN ID from the inter-PLMN SBI request message, comparing the at least one parameter from the access token and the at least one parameter external to the access token includes comparing the PLMN ID obtained from the access token with the remote SEPP PLMN ID obtained from the inter-PLMN SBI request message, and performing the network security action includes performing the network security action when the PLMN ID obtained from the access token and the remote PLMN ID obtained from the inter-PLMN SBI request message do not match.

According to another aspect of the subject matter described herein, the method for detecting and mitigating security attacks on producer NFs includes, when the at least one network-identifying or service-identifying parameter obtained from the access token matches the at least one network-identifying or service-identifying parameter obtained externally from the access token: identifying, by the proxy NF and from the inter-PLMN SBI request message, a consumer NF and a producer NF; determining, by the proxy NF, whether a rate of SBI request messages from the consumer NF to the producer NF exceeds a configured threshold; and, when the rate of inter-PLMN SBI request messages from consumer NF to the producer NF exceeds the threshold, performing, by the proxy NF, a network security action.

According to another aspect of the subject matter described herein, performing the network security action includes blocking the SBI request message.

According to another aspect of the subject matter described herein, performing the network security action includes transmitting a fake error response generated by the proxy NF in response to the inter-PLMN SBI request message.

According to another aspect of the subject matter described herein, the proxy NF comprises a security edge protection proxy (SEPP).

According to another aspect of the subject matter described herein, the proxy NF comprises a service communication proxy (SCP).

According to another aspect of the subject matter described herein, a system for detecting and mitigating security attacks on producer network functions (NFs) using access token to non-access-token parameter correlation at a proxy NF is provided. The system includes a proxy NF including at least one processor and a memory. The system further includes an inter-PLMN SBI request security controller implemented by the at least one processor for receiving an inter-public land mobile network (PLMN) service-based interface (SBI) request message, obtaining, from an access token transmitted with the inter-PLMN SBI request message, at least one network-identifying or service-identifying parameter, obtaining, externally from the access token, at least one network-identifying or service-identifying parameter, comparing the at least one network-identifying or service-identifying parameter obtained from the access token and the at least one network-identifying or service-identifying parameter obtained externally from the access token, and performing a network security action when the at least one network-identifying or service-identifying parameter obtained from the access token does not match the at least one network-identifying or service-identifying parameter obtained externally from the access token.

According to another aspect of the subject matter described herein, the inter-PLMN SBI request security controller is configured to: obtain the at least one network-identifying or service-identifying parameter from the access token by reading a producer service name parameter from a scope field of the access token; obtain the at least one network-identifying or service-identifying parameter externally from the access token by reading a service name from a 3gpp-Sbi-Target-apiRoot header of the inter-PLMN SBI request message; compare the at least one network-identifying or service-identifying parameter obtained from the access token and the at least one network-identifying parameter or service-identifying parameter obtained externally from the access token by comparing the producer service name obtained from the scope field of the access token with the service name obtained from the 3gpp-Sbi-Target-apiRoot header of the inter-PLMN SBI request message; and perform the network security action when the service name obtained from the scope field of the access token and the service name obtained from the 3gpp-Sbi-Target-apiRoot header of the inter-PLMN SBI request message do not match.

According to another aspect of the subject matter described herein, the inter-PLMN SBI request security controller is configured to: obtain at least one network-identifying or service-identifying parameter from the access token by reading a target PLMN ID from the access token; obtain the at least one network-identifying or service-identifying parameter externally from the access token by reading a PLMN ID from a fully qualified domain name (FQDN) from a 3gpp-Sbi-Target-apiRoot header of the inter-PLMN SBI request message; compare the at least one network-identifying or service-identifying parameter from the access token and the at least one network-identifying or service-identifying parameter obtained externally from the access token by comparing the target PLMN ID obtained from the access token with the PLMN ID obtained from the FQDN of the 3gpp-Sbi-Target-apiRoot header of the inter-PLMN SBI request message; and perform the network security action when the target PLMN ID obtained from the access token and the PLMN ID obtained from the FQDN of the 3gpp-Sbi-Target-apiRoot header of the inter-PLMN SBI request do not match.

According to another aspect of the subject matter described herein, the inter-PLMN SBI request security controller is configured to: obtain the at least one network-identifying or service-identifying parameter from the access token by reading a PLMN ID from the access token; obtain the at least one network-identifying or service-identifying parameter externally from the access token includes reading a SEPP PLMN ID from the inter-PLMN SBI request message of from configuration memory of the proxy NF; compare the at least one network-identifying or service-identifying parameter obtained from the access token and the at least one network-identifying or service-identifying parameter obtained externally from the access token by comparing the PLMN ID obtained the access token with the SEPP PLMN ID; and perform the network security action when the PLMN ID obtained from the access token and the SEPP PLMN ID do not match.

According to another aspect of the subject matter described herein, the inter-PLMN SBI request security controller is configured to: obtain at least one network-identifying or service-identifying parameter from the access token by reading a PLMN ID from the access token; obtain the at least one parameter external to the access token by reading a remote SEPP PLMN ID from the inter-PLMN SBI request message; compare the at least one parameter from the access token and the at least one parameter external to the access token by comparing the PLMN ID obtained from the access token with the remote SEPP PLMN ID obtained from the inter-PLMN SBI request message; and perform the network security action when the PLMN ID obtained from the access token and the remote PLMN ID obtained from the inter-PLMN SBI request message do not match.

According to another aspect of the subject matter described herein, the inter-PLMN SBI request security controller is configured to, when the at least one network-identifying or service-identifying parameter obtained from the access token matches the at least one network-identifying or service-identifying parameter obtained externally from the access token: identify, from the inter-PLMN SBI request message, a consumer NF and a producer NF; determine, by the proxy NF, whether a rate of SBI request messages from the consumer NF to the producer NF exceeds a configured threshold; and, when the rate of inter-PLMN SBI request messages from consumer NF to the producer NF exceeds the threshold, perform the network security action.

According to another aspect of the subject matter described herein, the network security action includes blocking the SBI request message.

According to another aspect of the subject matter described herein, the network security action includes transmitting a fake error response generated by the proxy NF in response to the inter-PLMN SBI request message.

According to another aspect of the subject matter described herein, the proxy NF comprises a security edge protection proxy (SEPP) or a service communication proxy (SCP).

According to another aspect of the subject matter described herein, a non-transitory computer readable medium comprising computer executable instructions that when executed by a processor of a computer control the computer to perform steps is provided. The steps include receiving, by a proxy network function (NF), an inter-public land mobile network (PLMN) service-based interface (SBI) request message. The steps further include obtaining, by the proxy NF and from an access token transmitted with the inter-PLMN SBI request message, at least one network-identifying or service-identifying parameter. The steps further include obtaining, by the proxy NF and externally from the access token, at least one network-identifying or service-identifying parameter. The steps further include comparing, by the proxy NF, the at least one network-identifying or service-identifying parameter obtained from the access token and the at least one network-identifying or service-identifying parameter obtained externally from the access token. The steps further include performing, by the proxy NF, a network security action when the at least one network-identifying or service-identifying parameter obtained from the access token does not match the at least one network-identifying or service-identifying parameter obtained externally from the access token.

The subject matter described herein can be implemented in software in combination with hardware and/or firmware. For example, the subject matter described herein can be implemented in software executed by a processor. In one exemplary implementation, the subject matter described herein can be implemented using a non-transitory computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

Exemplary implementations of the subject matter described herein will now be explained with reference to the accompanying drawings, of which.

DETAILED DESCRIPTION

Figure 1:
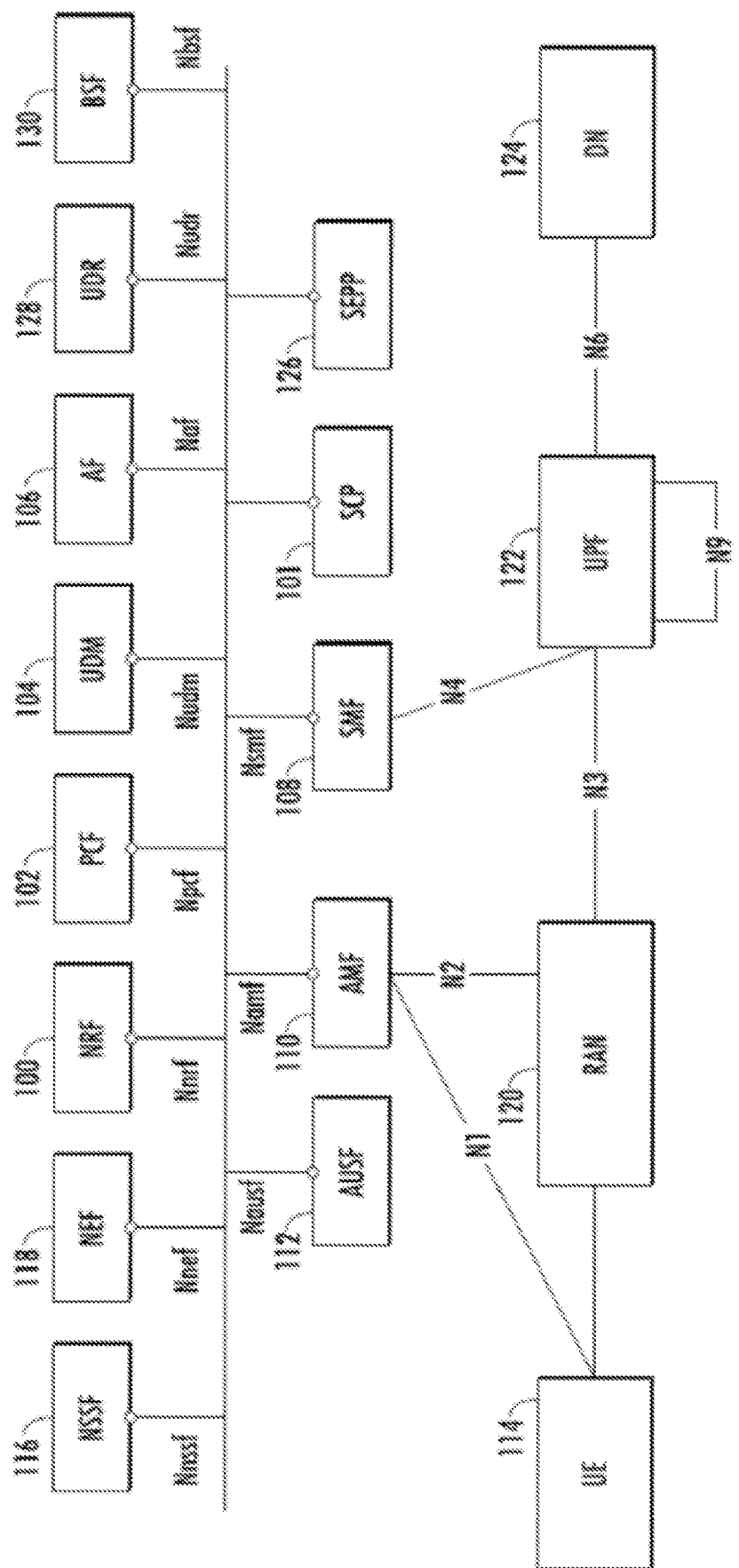
FIG. 1 is a network diagram illustrating an exemplary 5G system network architecture.

FIG. 1 is a block diagram illustrating an exemplary 5G system network architecture. The architecture in FIG. 1 includes NRF 100 and SCP 101, which may be located in the same home public land mobile network (HPLMN). As described above, NRF 100 may maintain profiles of available NF instances and their supported services and allow consumer NFs or SCPs to subscribe to and be notified of the registration of new/updated NF instances. SCP 101 may also support service discovery and selection of NF instances. SCP 101 may perform load balancing of connections between consumer and producer NFs.

NRF 100 is a repository for profiles of NF instances. To communicate with a producer NF instance, a consumer NF or an SCP must obtain the NF profile of the producer NF instance from NRF 100. The NF profile is a JavaScript object notation (JSON) data structure defined in 3GPP TS 29.510. The NF profile includes attributes that indicate the type of service provided, capacity of the NF instance, and information for contacting the NF instance.

In FIG. 1, any of the network functions can be consumer NFs, producer NFs, or both, depending on whether they are requesting, providing, or requesting and providing services. In the illustrated example, the NFs include a policy control function (PCF) 102 that performs policy related operations in a network, a unified data management function (UDM) 104 that manages user data, and an application function (AF) 106 that provides application services.

The NFs illustrated in FIG. 1 further include a session management function (SMF) 108 that manages sessions between an access and mobility management function (AMF) 110 and PCF 102. AMF 110 performs mobility management operations similar to those performed by a mobility management entity (MME) in 4G networks. An authentication server function (AUSF) 112 performs authentication services for user equipment (UEs), such as user equipment (UE) 114, seeking access to the network.

A network slice selection function (NSSF) 116 provides network slicing services for devices seeking to access specific network capabilities and characteristics associated with a network slice. NSSF 116 provides the NSSelection service, which allows NFs to request information about network slices and the NSSAIReachability service, which enables NFs to update and subscribe to receive notification of updates in network slice selection assistance information (NSSAI) reachability information.

A network exposure function (NEF) 118 provides application programming interfaces (APIs) for application functions seeking to obtain information about Internet of things (IoT) devices and other UEs attached to the network. NEF 118 performs similar functions to the service capability exposure function (SCEF) in 4G networks.

A radio access network (RAN) 120 connects user equipment (UE) 114 to the network via a wireless link. Radio access network 120 may be accessed using a gNB (not shown in FIG. 1) or other wireless access point. A user plane function (UPF) 122 can support various proxy functionality for user plane services. One example of such proxy functionality is multipath transmission control protocol (MPTCP) proxy functionality. UPF 122 may also support performance measurement functionality, which may be used by UE 114 to obtain network performance measurements. Also illustrated in FIG. 1 is a data network (DN) 124 through which UEs access data network services, such as Internet services.

SEPP 126 filters incoming traffic from another PLMN and performs topology hiding for traffic exiting the home PLMN. SEPP 126 may communicate with an SEPP in a foreign PLMN which manages security for the foreign PLMN. Thus, traffic between NFs in different PLMNs may traverse two SEPP functions, one for the home PLMN and the other for the foreign PLMN. A unified data repository (UDR) 128 stores subscription data for UEs. A binding support function (BSF) 130 manages bindings between PDU sessions and PCFs.

Figure 2:
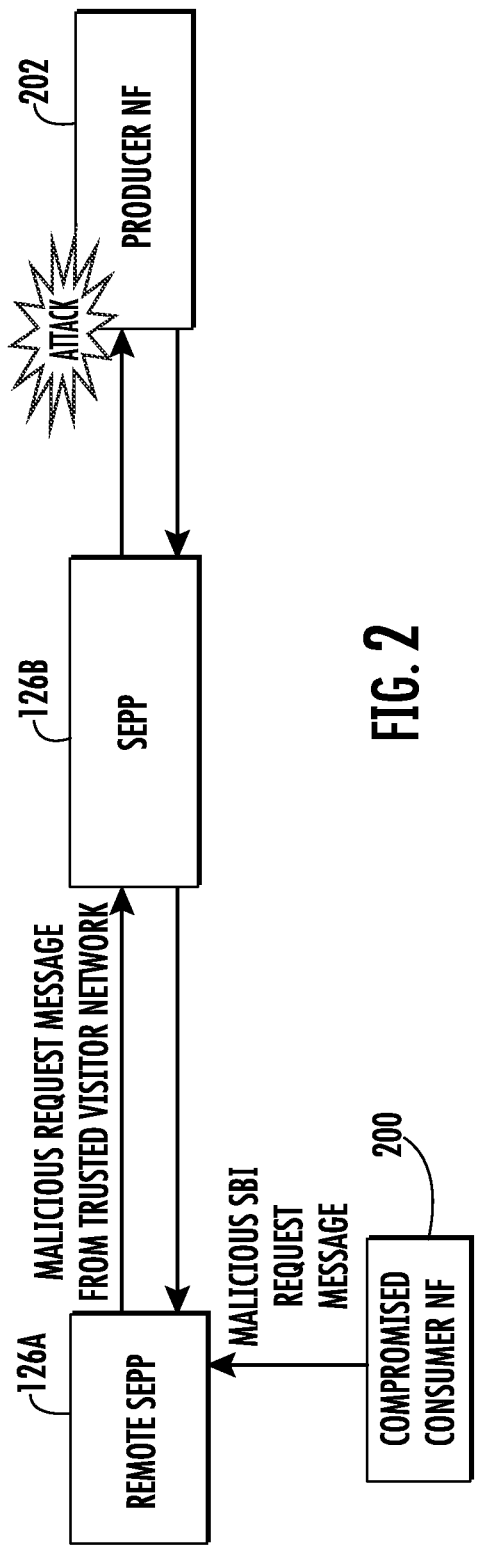
FIG. 2 is a network diagram illustrating the transmission of a malicious inter-PLMN SBI request message from a trusted visitor network to a producer NF.

As described above, one problem that can occur in 5G and other types of networks is that inter-PLMN SBI request messages from trusted networks can be used for DOS attacks on producer NFs. FIG. 2 is a network diagram illustrating the transmission of a malicious inter-PLMN SBI request message from a trusted visitor network to a producer NF located in the home network. Referring to FIG. 2, a compromised consumer NF 200 originates a malicious SBI request message and forwards the request to SEPP 126A. SEPP 126A forwards the SBI request message to SEPP 126B. SEPP 126B determines that the SBI request message originates from a trusted network and forwards the SBI request message to producer NF 202. The SBI request message may be successfully processed or may result in an error at producer NF 202. Producer NF 202 generates a response message and forwards the response message to SEPP 126B. SEPP 126B forwards the response message to SEPP 126A. SEPP 126A forwards the response message to consumer NF 200.

One problem with the scenario illustrated in FIG. 2 is that SEPP 126B allows the malicious SBI request messages into the network because the SBI request messages originate from a trusted network. If compromised consumer NF 200 generates a sufficient volume of SBI request messages directed to producer NF 202, consumer NF 200 can overwhelm the processing resources of producer NF 202. The SBI request messages may include valid OAuth 2.0 access tokens because consumer NF 202 obtained the access token from an NRF.

To address the problem illustrated in FIG. 2, a proxy NF, such as an SEPP or SCP, may compare one or more parameters obtained from an access token, such as an OAuth 2.0 access token, with one or more parameters external to the access token. If parameters match, the first stage of the validation passes. If the parameters do not match, the validation fails, and the proxy NF performs a network security action, such as blocking forwarding of the message to the producer NF. If the first stage of the message validation passes, the proxy NF may determine whether the rate of SBI request messages from a consumer NF to a producer NF is greater than a threshold value. If the rate is greater than the threshold value, the proxy NF may perform a network security action. If the rate is less than the threshold, the proxy NF may forward the SBI request message to the producer NF.

Figure 3:
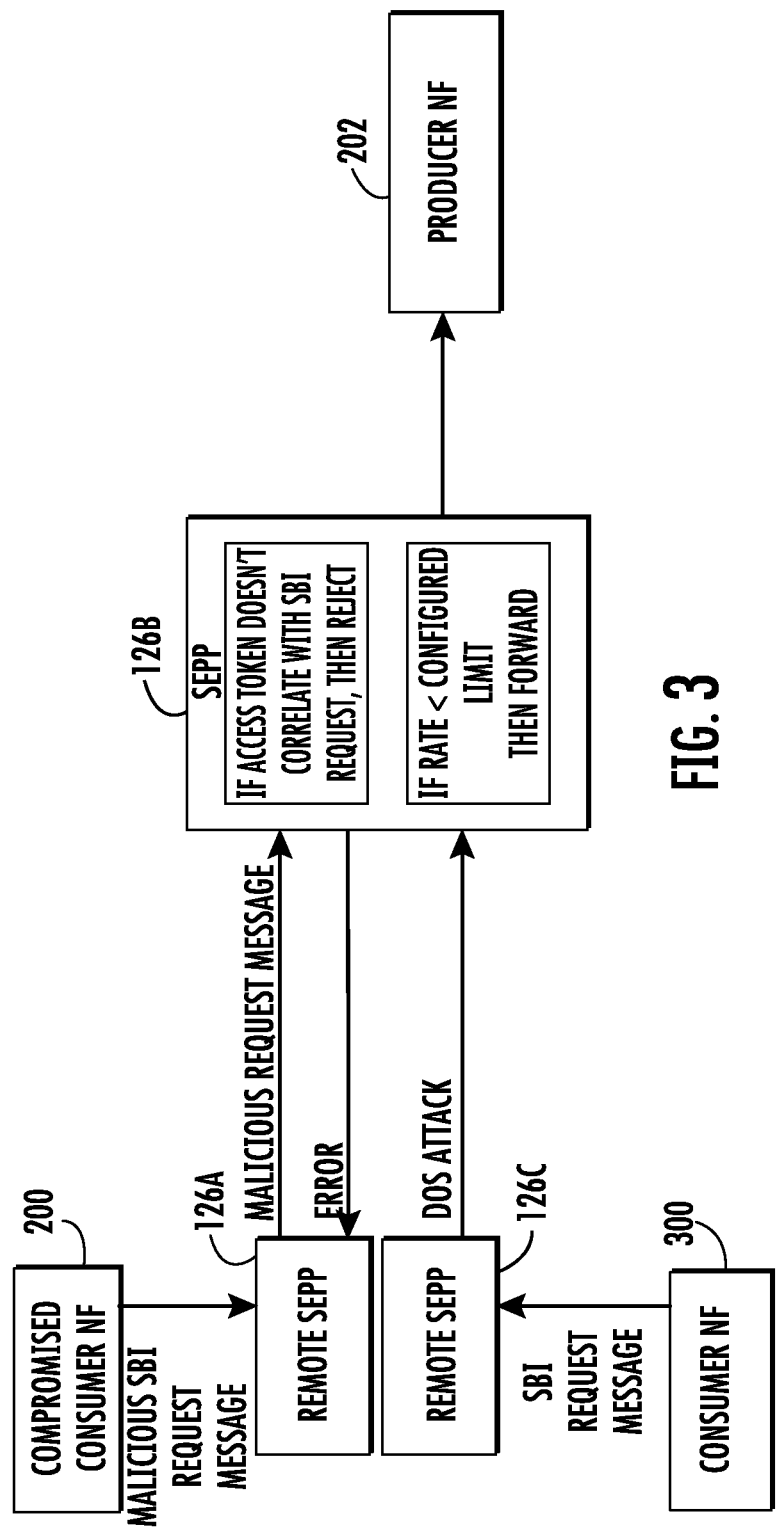
FIG. 3 is a diagram illustrating the use of access token to non-access-token parameter correlation and SBI request message rate checking at the SEPP to mitigate security attacks on a producer NF.

FIG. 3 is a network diagram illustrating the use of access token to non-access-token SBI request message parameter correlation and SBI request message rate checking at a proxy NF to mitigate security attacks on a producer NF. Referring to FIG. 3, compromised consumer NF 200 generates a malicious SBI request message and forwards the malicious SBI request message to remote SEPP 126A. Remote SEPP 126A forwards the malicious SBI request message to SEPP 126B. SEPP 126B obtains one or more network- or service-identifying parameters from the access token and one or more network- or service-identifying parameters that are external to the access token. SEPP 126B compares the parameters. If the parameters match, SEPP 126B determines that the message passes the first stage of inter-PLMN request validation and performs SBI request message rate validation. Performing SBI request message rate validation may include tracking the rate of SBI request messages from a consumer NF to a producer NF, determining whether a rate limit is exceeded, and, if the rate limited is exceeded, performing a network security action.

In FIG. 3, it is assumed that the SBI request message from consumer NF 200 fails the access token to non-access-token parameter correlation check. Accordingly, SEPP 126B performs the network security actions of blocking the SBI request message from being forwarded to producer NF 202 and generating an error response on behalf of producer NF 202. In one example, the error response may be a fake error response that appears to originate from a producer NF.

Consumer NF 300 generates an SBI request message and forwards the SBI request message to remote SEPP 126C. Remote SEPP 126C forwards the SEPP request message to SEPP 126B. SEPP 126B determines performs the access token to non-access-token parameter correlation, determines that the parameters match, and that the current rate of SBI request messages from consumer NF 300 to producer NF 202 does not exceed the threshold. Accordingly, SEPP 126B forwards the SBI request message to producer NF 202. It should be noted that even though as indicated in FIG. 3 the message from consumer NF 300 is part of a DOS attack, the message is forwarded to producer NF 202. The reason that the message is forwarded is that consumer NF 300 has not yet generated a sufficient volume of SBI request messages to producer NF 202 to be considered part of a DOS attack. SEPP 126B may increment its count of SBI request messages from consumer NF 300 to producer NF 202 each time consumer NF 300 sends an SBI request message to producer NF 202. If the threshold is exceeded when an SBI request message is received, SEPP 126B will block the message, even if the access token to non-access-token parameter correlation check passes.

Figure 4:
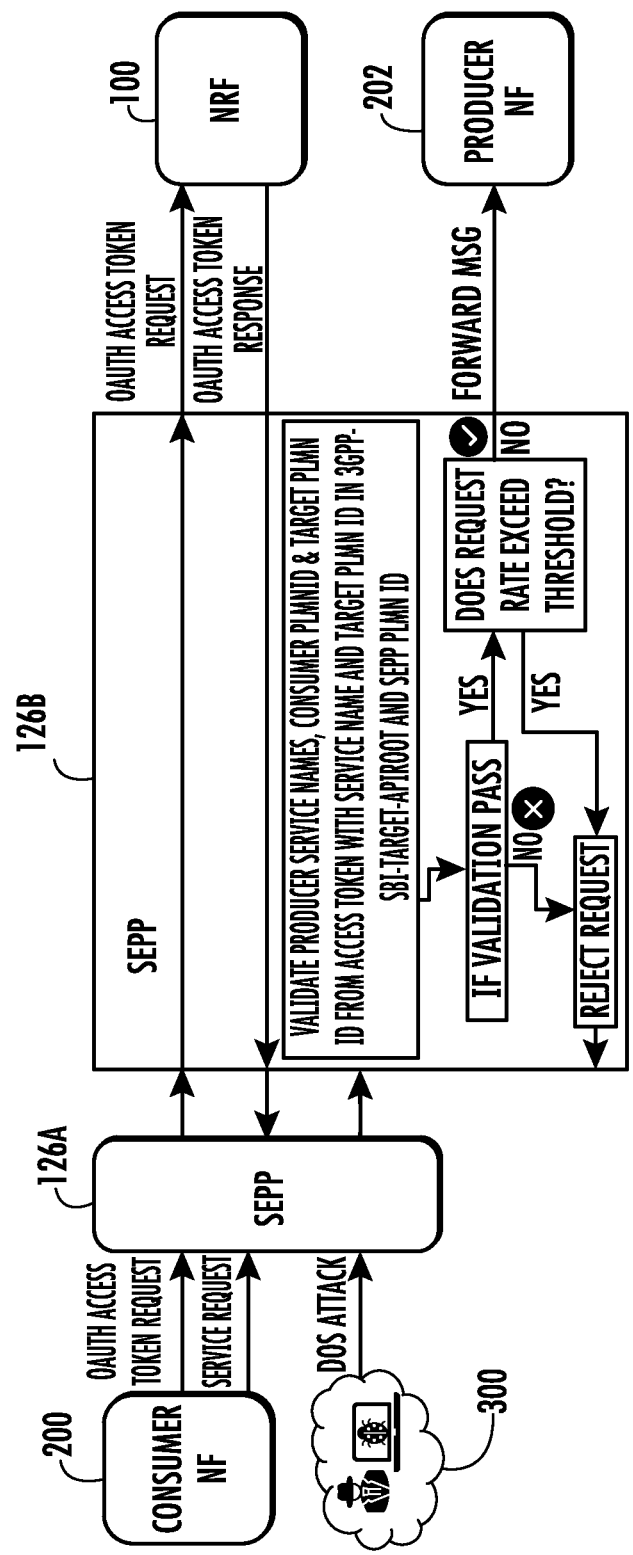
FIG. 4 is a diagram illustrating processing within the SEPP to use access token to non-access-token parameter correlation and SBI request message rate checking to mitigate security attacks on a producer NF.

FIG. 4 is a diagram illustrating processing within the SEPP that uses access token to non-access-token parameter correlation and SBI request message rate checking to mitigate security attacks on a producer NF. Referring to FIG. 4, SEPP 126B receives SBI request messages from consumer NFs 200 and 300. For each SBI request message, SEPP 126B performs a correlation check between at least network or service identifying parameter from the access token and at least one network or service identifying parameter external to the access token. In the illustrated example, SEPP 126B obtains the producer service name, the consumer PLMN ID, and the target PLMN ID from the access token. SEPP 126B obtains the service name and the target PLMN ID from the 3gpp-Sbi-Target-apiRoot header. Because SEPP 126B is functioning as the producer NF SEPP, SEPP 126B may also obtain the remote SEPP ID from the SBI request message. To perform the initial correlation check, SEPP 126B compares the service name from the access token with the service name from the 3gpp-Sbi-Target-apiRoot header, the target PLMN ID from the access token with the target PLMN ID from the 3gpp-Sbi-Target-apiRoot header, and the consumer PLMN ID from the access token with the remote SEPP ID from the SBI request message. If all of the parameter pairs match, SEPP 126B determines that the message has passed the correlation check. If any of the parameter pairs do not match, SEPP 126B determines that the message does not pass the correlation check and performs a network security action.

If the message passes the correlation check, SEPP 126B determines whether the message passes an SBI request message rate check. Determining whether the SBI request message passes the SBI request message rate includes tracking rates of SBI request messages for each combination of consumer and producer NFs, updating the rate when a new SBI request message is received, rejecting the SBI request messages if the rate exceeds a threshold, and passing the SBI request messages if the rates do not exceed the threshold.

Figure 5:
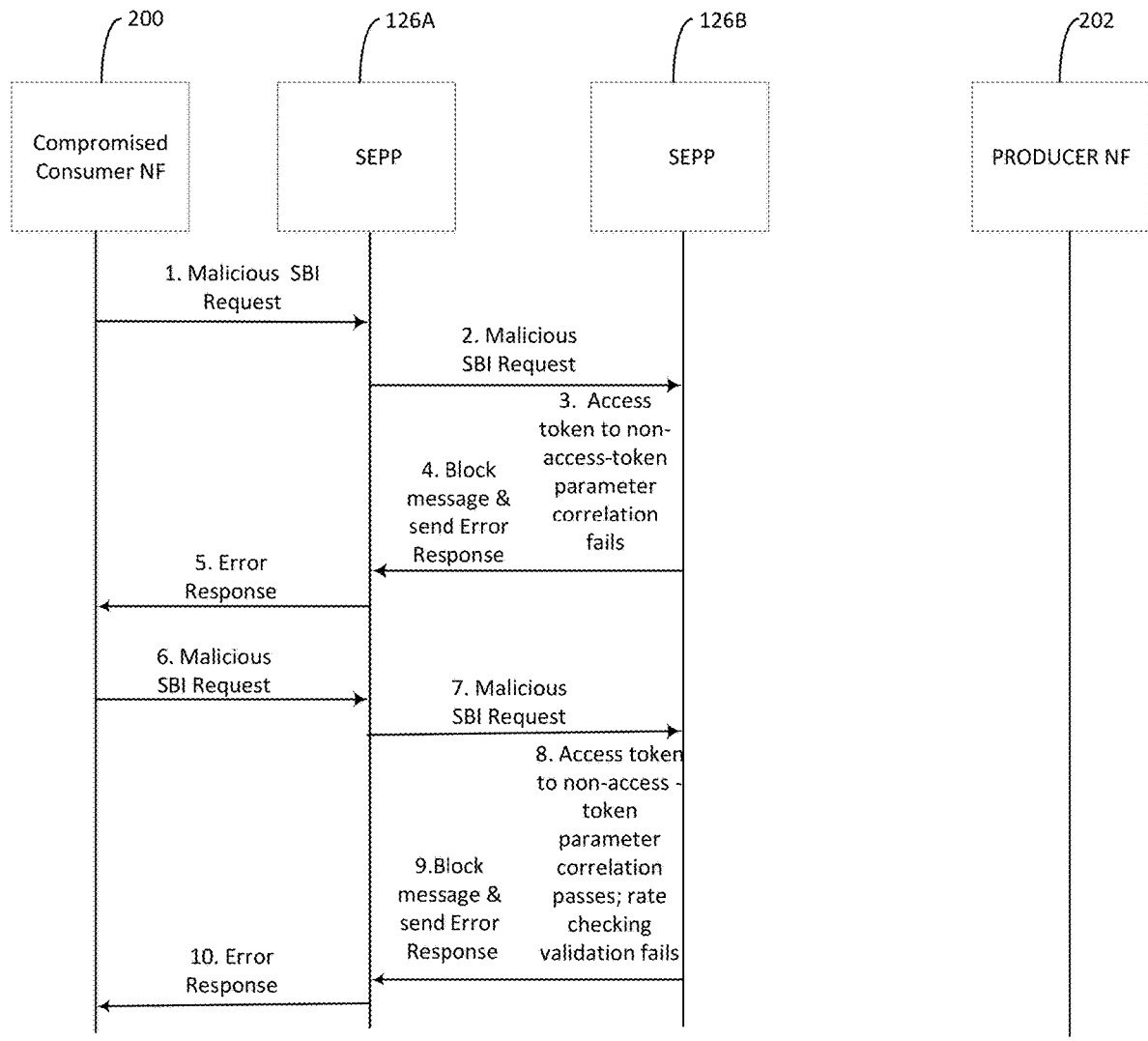
FIG. 5 is a message flow diagram illustrating exemplary messages exchanged in a network where the SEPP uses access token to non-access-token parameter correlation and SBI request message rate checking to mitigate security attacks on a producer NF.

FIG. 5 is a message flow diagram illustrating exemplary messages exchanged in a network where the SEPP uses access token to non-access-token parameter correlation and SBI request message rate checking. Referring to FIG. 5, in step 1, compromised consumer NF 200 sends a malicious SBI request to producer NF 202 via SEPP 126A. In step 2, SEPP 126A forwards the request to SEPP 126B. In step 3, SEPP 126B receives the SBI request and determines that the message fails the access token to non-access-token parameter correlation checking. In step 4, SEPP 126B performs the network security actions of blocking the message and generating and sending an error response on behalf of producer NF 202. In step 5, SEPP 126A forwards the error response to consumer NF 200.

In step 6, consumer NF 200 generates another malicious SBI request and sends the SBI request to SEPP 126A. In step 7, SEPP 126A sends the SBI request to SEPP 126B. SEPP 126B determines that the message passes the access token to non-access-token parameter correlation check but determines that the message fails the SBI request message rate check. SEPP 126B may make this determination by accessing an SBI request rate tracking database and locating or creating an entry to track SBI request message rates from consumer NF 200 to producer NF 202. Table 1 shown below is an example of data that may be included in the SBI request rate tracking database.

TABLE 1

Example SBI Request Message Rate Data Tracked by SEPP

| Consumer NF ID | Producer NF ID | SBI Request Count | SBI Request Timestamps | SBI Request Rate Limit |
|---|---|---|---|---|
| AMF1 | UDR1 | 10 | 0700:00 0700:10 0700:18 . . . | 10/min |

In Table 1, the entry for tracking SBI request message rates from consumer NF 200 to producer NF 202 may include consumer NF identifying information, producer NF identifying information, an SBI request message rate, timestamps of receipt of the SBI request messages, and an operator-configured limit. SEPP 126B may obtain the consumer NF ID from an OAuth 2.0 access token, which is required to be included in SBI request messages. SEPP 126B may also obtain the producer NF ID from the OAuth 2.0 access token of the SBI request. SEPP 126B may alternatively obtain the producer NF ID from a 3gpp-Sbi-Target-apiRoot header of the SBI request message. The SBI request message count may be a running count of the number of SBI request messages from the consumer NF to the producer NF that are received within a configured time period before the current time. To maintain the SBI request message count, SEPP 126B may increment the SBI request message count each time an SBI request message from consumer NF 200 to producer NF 202 is received and store a timestamp indicating time of receipt of the SBI request message.

SEPP 126B may decrement the SBI request message count each time a timestamp of one of the previously-received SBI request messages falls outside of a moving or sliding time window that is a predetermined time before the current time. Thus, the SBI request message count is a running count of the number of SBI request messages received within an operator-configured time period. This, the term "rate of SBI request messages" includes a count of SBI request messages received within a time period and/or a rate calculated by dividing the number of SBI request messages received by the time period. SEPP 126B determines whether the rate is greater than the threshold rate or rate limit value. The threshold rate or rate limit value may be a rate, as indicated by the example in Table 1 or a count for a given time period, which implies a rate. If the rate exceeds the threshold, SEPP 126B may perform network security actions for the present request and for subsequent requests matching the entry in the database.

Returning to FIG. 5, when the message fails the request message rate check, in step 9, SEPP 126B blocks the SBI request message and generates and sends an error response to SEPP 126A. As indicated above, the error response may be a fake error response generated on behalf of producer NF 202. In step 10, SEPP 126A forwards the response to consumer NF 200.

Figure 6:
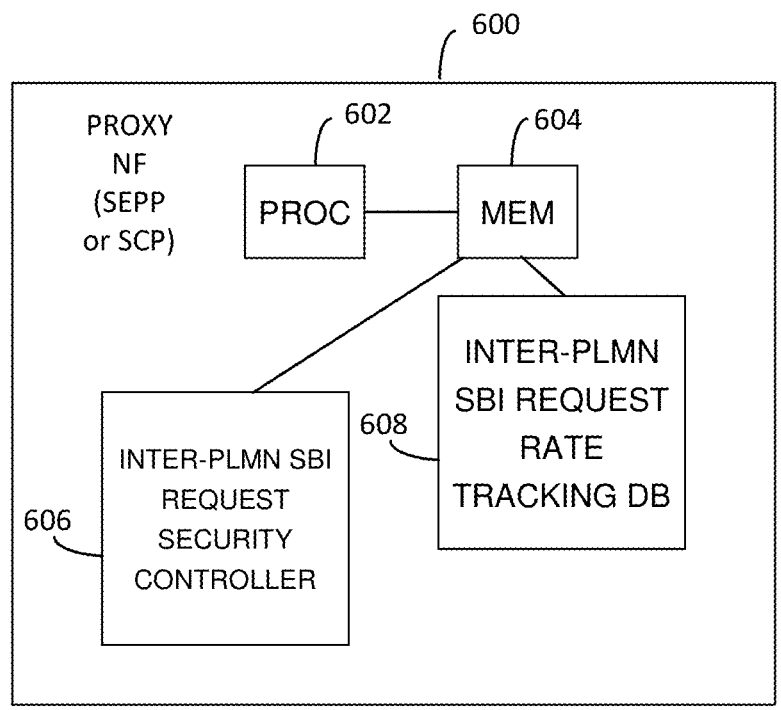
FIG. 6 is a block diagram illustrating an exemplary architecture of a proxy NF for using access token to non-access-token parameter correlation and SBI request message rate checking to mitigate security attacks.

As stated above, access token and non-access-token parameter correlation and SBI request message rate checking can be performed at a proxy NF, such as an SEPP or an SCP. FIG. 6 is a block diagram illustrating an exemplary architecture of a proxy NF for performing access token to non-access-token parameter correlation and SBI message rate checking to mitigate denial of service attacks. Referring to FIG. 6, proxy NF 600 may be an SCP or an SEPP that includes at least one processor 602 and memory 604. Proxy NF 600 further includes an inter-PLMN SBI request security controller 606 for detecting and mitigating security attacks based using access token to non-access-token parameter correlation and SBI request message rate checking. Proxy NF 600 further includes an SBI request message rate tracking database 608 that stores, on a per-consumer-NF and per-producer-NF basis, SBI request message counts. Inter-PLMN SBI request security controller 606 may be implemented using computer executable instructions stored in memory 604 and executed by processor 602.

Figure 7:
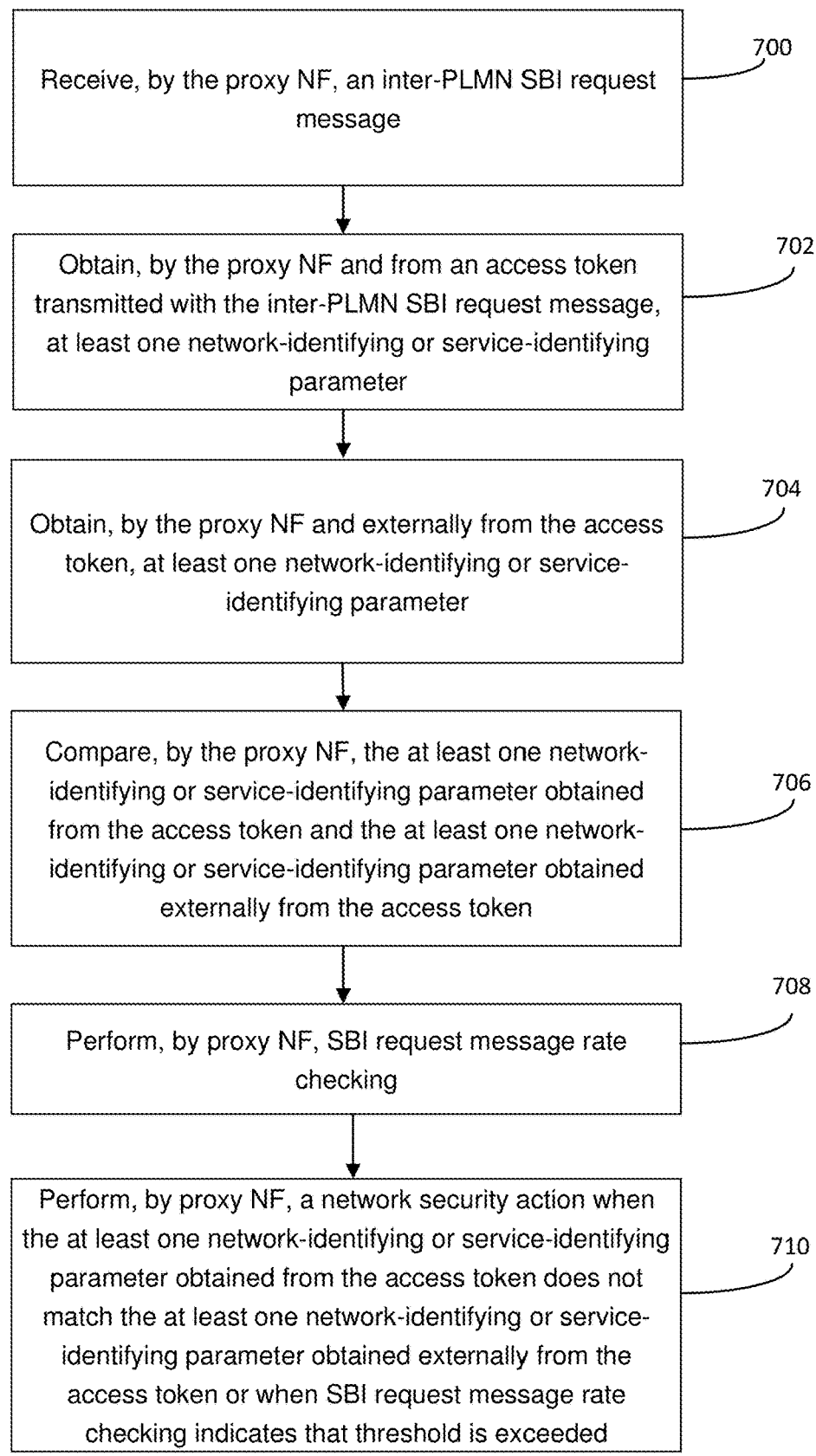
FIG. 7 is a flow chart illustrating an exemplary process using access token to non-access-token parameter correlation and SBI request message rate checking to mitigate security attacks on a producer NF.

FIG. 7 is a flow chart illustrating an exemplary process for mitigating security attacks using access token to non-access-token parameter correlation and SBI request message rate validation. Referring to FIG. 7, in step 700 the process includes receiving, by the proxy NF, an inter-PLMN SBI request message. For example, inter-PLMN SBI request security controller 606 of proxy NF 600 may receive an SBI request message from an SEPP in another PLMN. The message may originate from a non-malicious consumer NF, a compromised consumer NF, or a hacker masquerading as a consumer NF.

In step 702, the process includes obtaining, by the proxy NF and from an access token transmitted with the inter-PLMN SBI request message, at least one network-identifying or service-identifying parameter. For example, inter-PLMN SBI request security controller 606 of proxy NF 600 may obtain a producer service name, a target PLMN, and/or a consumer PLMN from the access token. The producer service name may be obtained from the scope field of the access token. The consumer PLMN ID can be obtained from the subject (sub) claim of the access token, as the consumer PLMN ID is appended to the consumer NF instance ID that is included in the subject claim. The consumer PLMN ID and the producer PLMN ID may alternatively be obtained from the consumerPlmnID and producerPlmnID claims, respectively. However, these claims are conditional and may not always be included in the access token. The target or producer PLMN ID can also be determined from the producer FQDN present in the 3gpp-sbi-target-apiRoot header.

In step 704, the process further includes obtaining, by the proxy NF and externally from the access token, at least one network-identifying or service-identifying parameter. For example, inter-PLMN SBI request security controller 606 of proxy NF 600 may obtain the service name and the PLMN ID from the 3gpp-Sbi-Target-apiRoot header of the inter-PLMN SBI request. If proxy NF 600 is functioning as the producer SEPP, SBI request security controller 606 of proxy NF 600 may obtain the remote SEPP ID from a non-access-token parameter, such as the N32-f context associated with the N32-f connection between proxy NF 600 and the entity that sent the inter-PLMN SBI request. If proxy NF 600 is functioning as the consumer SEPP, SBI request security controller 606 of proxy NF 600 may obtain the C-SEPP ID from configuration memory of proxy NF 600 or from the User-Agent header of the inter-PLMN SBI request.

In step 706, the process further includes comparing, by the proxy NF, the at least one network-identifying or service-identifying parameter obtained from the access token and the at least one network-identifying or service-identifying parameter obtained externally from the access token. Table 2 shown below illustrates the parameters that may be compared.

TABLE 2

Access Token and Non-access-token Parameter Comparison

| Parameters | Service Name in 3gpp-Sbi-Target-apiRoot header | PLMN ID in 3gpp-Sbi-Target-apiRoot header | SEPP PLMN ID when SEPP is action as C-SEPP | Remote PLMN ID when SEPP is acting as P-SEPP |
|---|---|---|---|---|
| Service name from scope field of Access Token | x | | | |
| Target PLMN ID from access token | | x | | |
| Consumer PLMN ID from access token | | | x | x |

In Table 2, the rows represent access token parameters, the columns represent parameters external to the access token, either from a non-access-token field of the SBI request message or from a configured parameter, such as the SEPP ID, of proxy NF 600, and the x marks in the corresponding cells represent parameters being compared. For example, the x in row 2 column 2 indicates that the service name from the scope field of the access token is compared with the service name from the 3gpp-Sbi-Target-apiRoot header. It should be noted that SBI request security controller 606 may perform any combination of one or more of the parameter checks illustrated in Table 2 when validating a received SBI request message.

In step 708, the process includes performing, by the proxy NF, SBI request message rate checking. For example, inter-PLMN SBI request security controller 606 of proxy NF 600 may determine whether the rate of SBI request messages from the consumer NF to the producer NF exceeds a configured threshold rate, where the rate can be a rate (messages per unit of time) or a running count within a time period.

In step 710, the process further includes performing, by the proxy NF, a network security action when the at least one network-identifying or service-identifying parameter obtained from the access token does not match the at least one network-identifying or service-identifying parameter obtained externally from the access token or when the SBI request message rate checking indicates that the threshold is exceeded. For example, if the parameters do not match or the rate is exceeded, inter-PLMN SBI request security controller 606 of proxy NF 600 may block the inter-PLMN SBI request message, block, throttle or limit subsequent messages from the consumer NF, generate a fake error response message on behalf of the producer NF, and/or alert a network operator of the attack. Messages to be throttled, blocked, or limited can be identified based on consumer NF, consumer SEPP, or producer service API.

Additional checks that may be performed by proxy NF 600 include:

Proxy NF 600 may monitor the access token assigned to a consumer NF to mitigate DOS attacks on target NFs.

Proxy NF 600 may fetch the consumer NF identity from an SBI request message, if possible, and validate the consumer NF identity against the access token.

Proxy NF 600 may deduce consumer/producer identities via other means and validate the identities against those present in the access token.

Exemplary advantages of the subject matter described herein include the ability to prevent or mitigate security/DOS attacks initiated from allowed locations (serving networks). By preventing or mitigating the attacks, the solution described herein protects the processing and other resources of producer NFs, which can cause the producer NFs to fail in unexpected ways.

The disclosure of each of the following references is hereby incorporated herein by reference in its entirety.

REFERENCES 1. 3rd Generation Partnership Project; Technical Specification Group Core Network and Terminals; 5G System; Network Function Repository Services; Stage 3 (Release 18) 3GPP TS 29.510 V18.4.0 (2023-09)
2. 3rd Generation Partnership Project; Technical Specification Group Services and System Aspects; System architecture for the 5G System; Stage 2 (Release 18) 3GPP TS 23.501 V18.3.0 (2023-09)
3. 3rd Generation Partnership Project; Technical Specification Group Core Network and Terminals; 5G System; Technical Realization of Service Based Architecture; Stage 3 (Release 18) 3GPP TS 29.500 V18.3.0 (2023-09)

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for detecting and mitigating security attacks on producer network functions (NFs) using access token to non-access-token parameter correlation at a proxy NF, the method comprising:

receiving, by the proxy NF, an inter-public land mobile network (PLMN) service-based interface (SBI) request message;

obtaining, by the proxy NF and from an OAuth 2.0 access token transmitted with the inter-PLMN SBI request message, at least one network-identifying or service-identifying parameter, wherein the at least one network identifying or service-identifying parameter comprises a consumer PLMN ID obtained from a subject claim of the OAuth 2.0 access token;

obtaining, by the proxy NF and externally from the OAuth 2.0 access token, at least one network-identifying or service-identifying parameter, wherein the at least one-network or service-identifying parameter comprises a remote security edge protection proxy (SEPP) PLMN ID;

comparing, by the proxy NF, the at least one network-identifying or service-identifying parameter obtained from the OAuth 2.0 access token and the at least one network-identifying or service-identifying parameter obtained externally from the OAuth 2.0 access token, wherein comparing the at least one network or service-identifying parameter obtained from the OAuth 2.0 access token and the at least one network-identifying or service-identifying parameter obtained externally from the OAuth 2.0 access token includes comparing the consumer PLMN ID obtained from the subject claim of the OAuth 2.0 access token with the remote SEPP PLMN ID obtained externally from the OAuth 2.0 access token; and performing, by the proxy NF, a network security action when the at least one network-identifying or service-identifying parameter obtained from the OAuth 2.0 access token does not match the at least one network-identifying or service-identifying parameter obtained externally from the OAuth 2.0 access token.

2. The method of claim 1 wherein:

obtaining the at least one network-identifying or service-identifying parameter from the OAuth 2.0 access token comprises obtaining a producer service name parameter from a scope field of the OAuth 2.0 access token;

obtaining the at least one network-identifying or service-identifying parameter externally from the OAuth 2.0 access token includes obtaining a service name from a 3gpp-Sbi-Target-apiRoot header of the inter-PLMN SBI request message;

comparing the at least one network-identifying or service-identifying parameter obtained from the OAuth 2.0 access token and the at least one network-identifying parameter or service-identifying parameter obtained externally from the OAuth 2.0 access token includes comparing the producer service name obtained from the scope field of the OAuth 2.0 access token with the service name obtained from the 3gpp-Sbi-Target-apiRoot header of the inter-PLMN SBI request message; and performing the network security action includes performing the network security action when the service name obtained from the scope field of the OAuth 2.0 access token and the service name obtained from the 3gpp-Sbi-Target-apiRoot header of the inter-PLMN SBI request message do not match.

3. The method of claim 1 wherein:
obtaining at least one network-identifying or service-identifying parameter from the OAuth 2.0 access token comprises obtaining a target PLMN ID from the OAuth 2.0 access token;
obtaining the at least one network-identifying or service-identifying parameter externally from the OAuth 2.0 access token includes obtaining a PLMN ID from a fully qualified domain name (FQDN) from a 3gpp-Sbi-Target-apiRoot header of the inter-PLMN SBI request message;
comparing the at least one network-identifying or service-identifying parameter from the OAuth 2.0 access token and the at least one network-identifying or service-identifying parameter obtained externally from the OAuth 2.0 access token includes comparing the target PLMN ID obtained from the OAuth 2.0 access token with the PLMN ID obtained from the FQDN of the 3gpp-Sbi-Target-apiRoot header of the inter-PLMN SBI request message; and
performing the network security action includes performing the network security action when the target PLMN ID obtained from the OAuth 2.0 access token and the PLMN ID obtained from the FQDN of the 3gpp-Sbi-Target-apiRoot header of the inter-PLMN SBI request message do not match.

4. The method of claim 1 wherein:
the remote SEPP PLMN ID includes obtaining the remote SEPP PLMN ID from the inter-PLMN SBI request message; and
performing the network security action includes performing the network security action when the consumer PLMN ID obtained from the subject claim of the OAuth 2.0 access token and the remote SEPP PLMN ID obtained from the inter-PLMN SBI request message do not match.

5. The method of claim 1 comprising, when the at least one network-identifying or service-identifying parameter obtained from the OAuth 2.0 access token matches the at least one network-identifying or service-identifying parameter obtained externally from the OAuth 2.0 access token:
identifying, by the proxy NF and from the inter-PLMN SBI request message, a consumer NF and a producer NF;
determining, by the proxy NF, whether a rate of SBI request messages from the consumer NF to the producer NF exceeds a configured threshold; and
when the rate of inter-PLMN SBI request messages from consumer NF to the producer NF exceeds the threshold, performing, by the proxy NF, a network security action.

6. The method of claim 1 wherein performing the network security action includes blocking the SBI request message.

7. The method of claim 1 wherein performing the network security action includes transmitting a fake error response generated by the proxy NF in response to the inter-PLMN SBI request message.

8. The method of claim 1 wherein the proxy NF comprises a SEPP.

9. The method of claim 1 wherein the proxy NF comprises a service communication proxy (SCP).

10. A system for detecting and mitigating security attacks on producer network functions (NFs) using access token to non-access-token parameter correlation at a proxy NF, the system comprising:
a proxy NF including at least one processor and a memory; and
an inter-PLMN SBI request security controller implemented by the at least one processor for:
receiving an inter-public land mobile network (PLMN) service-based interface (SBI) request message, obtaining, from an OAuth 2.0 access token transmitted with the inter-PLMN SBI request message, at least one network-identifying or service-identifying parameter, wherein the at least one network identifying or service-identifying parameter comprises a consumer PLMN ID obtained from a subject claim of the OAuth 2.0 access token;
obtaining, externally from the OAuth 2.0 access token, at least one network-identifying or service-identifying parameter, wherein the at least one network-identifying or service-identifying parameter includes a remote security edge protection proxy (SEPP) PLMN ID;
comparing the at least one network-identifying or service-identifying parameter obtained from the OAuth 2.0 access token and the at least one network-identifying or service-identifying parameter obtained externally from the OAuth 2.0 access token, wherein comparing the at least one network or service-identifying parameter obtained from the OAuth 2.0 access token and the at least one network-identifying or service-identifying parameter obtained externally from the OAuth 2.0 access token includes comparing the consumer PLMN ID obtained from the subject claim of the OAuth 2.0 access token with the remote SEPP PLMN ID obtained externally from the OAuth 2.0 access token; and
performing a network security action when the at least one network-identifying or service-identifying parameter obtained from the OAuth 2.0 access token does not match the at least one network-identifying or service-identifying parameter obtained externally from the OAuth 2.0 access token.

11. The system of claim 10 wherein the inter-PLMN SBI request security controller is configured to:
obtain the at least one network-identifying or service-identifying parameter from the OAuth 2.0 access token by reading a producer service name parameter from a scope field of the OAuth 2.0 access token;
obtain the at least one network-identifying or service-identifying parameter externally from the OAuth 2.0 access token by reading a service name from a 3gpp-Sbi-Target-apiRoot header of the inter-PLMN SBI request message;
compare the at least one network-identifying or service-identifying parameter obtained from the OAuth 2.0 access token and the at least one network-identifying parameter or service-identifying parameter obtained externally from the OAuth 2.0 access token by comparing the producer service name obtained from the scope field of the OAuth 2.0 access token with the service name obtained from the 3gpp-Sbi-Target-apiRoot header of the inter-PLMN SBI request message; and perform the network security action when the service name obtained from the scope field of the OAuth 2.0 access token and the service name obtained from the 3gpp-Sbi-Target-apiRoot header of the inter-PLMN SBI request message do not match.

12. The system of claim 11 wherein the inter-PLMN SBI request security controller is configured to:
  obtain at least one network-identifying or service-identifying parameter from the OAuth 2.0 access token by reading a target PLMN ID from the OAuth 2.0 access token;
  obtain the at least one network-identifying or service-identifying parameter externally from the OAuth 2.0 access token by reading a PLMN ID from a fully qualified domain name (FQDN) from a 3gpp-Sbi-Target-apiRoot header of the inter-PLMN SBI request message;
  compare the at least one network-identifying or service-identifying parameter from the OAuth 2.0 access token and the at least one network-identifying or service-identifying parameter obtained externally from the OAuth 2.0 access token by comparing the target PLMN ID obtained from the OAuth 2.0 access token with the PLMN ID obtained from the FQDN of the 3gpp-Sbi-Target-apiRoot header of the inter-PLMN SBI request message; and
  perform the network security action when the target PLMN ID obtained from the OAuth 2.0 access token and the PLMN ID obtained from the FQDN of the 3gpp-Sbi-Target-apiRoot header of the inter-PLMN SBI request do not match.

13. The system of claim 11 wherein the inter-PLMN SBI request security controller is configured to:
  obtain the remote SEPP PLMN ID from the inter-PLMN SBI request message; and
  perform the network security action when the consumer PLMN ID obtained from the subject claim of the OAuth 2.0 access token and the remote SEPP PLMN ID obtained from the inter-PLMN SBI request message do not match.

14. The system of claim 10 wherein the inter-PLMN SBI request security controller is configured to, when the at least one network-identifying or service-identifying parameter obtained from the OAuth 2.0 access token matches the at least one network-identifying or service-identifying parameter obtained externally from the OAuth 2.0 access token:
  identify, from the inter-PLMN SBI request message, a consumer NF and a producer NF;
  determine, by the proxy NF, whether a rate of SBI request messages from the consumer NF to the producer NF exceeds a configured threshold; and
  when the rate of inter-PLMN SBI request messages from consumer NF to the producer NF exceeds the threshold, perform the network security action.

15. The system of claim 10 wherein the network security action includes blocking the SBI request message.

16. The system of claim 10 wherein the network security action includes transmitting a fake error response generated by the proxy NF in response to the inter-PLMN SBI request message.

17. The system of claim 10 wherein the proxy NF comprises a SEPP or a service communication proxy (SCP).

18. A non-transitory computer readable medium comprising computer executable instructions that when executed by a processor of a computer control the computer to perform steps comprising:
  receiving, by a proxy network function (NF), an inter-public land mobile network (PLMN) service-based interface (SBI) request message;
  obtaining, by the proxy NF and from an OAuth 2.0 access token transmitted with the inter-PLMN SBI request message, at least one network-identifying or service-identifying parameter, wherein the at least one network identifying or service-identifying parameter comprises a consumer PLMN ID obtained from a subject claim of the OAuth 2.0 access token;
  obtaining, by the proxy NF and externally from the OAuth 2.0 access token, at least one network-identifying or service-identifying parameter, wherein the at least one network-identifying or service-identifying parameter includes a remote security edge protection proxy (SEPP) PLMN ID;
  comparing, by the proxy NF, the at least one network-identifying or service-identifying parameter obtained from the OAuth 2.0 access token and the at least one network-identifying or service-identifying parameter obtained externally from the OAuth 2.0 access token, wherein comparing the at least one network or service-identifying parameter obtained from the OAuth 2.0 access token and the at least one network-identifying or service-identifying parameter obtained externally from the OAuth 2.0 access token includes comparing the consumer PLMN ID obtained from the subject claim of the OAuth 2.0 access token with the remote SEPP PLMN ID obtained externally from the OAuth 2.0 access token; and
  performing, by the proxy NF, a network security action when the at least one network-identifying or service-identifying parameter obtained from the OAuth 2.0 access token does not match the at least one network-identifying or service-identifying parameter obtained externally from the OAuth 2.0 access token.

* * * * *